(12) United States Patent
Lin et al.

(10) Patent No.: US 6,621,534 B2
(45) Date of Patent: Sep. 16, 2003

(54) ELECTRICALLY CONTROLLABLE SYSTEM AND GLAZING UNIT HAVING A FUNCTIONAL COMPONENT FOR CONTROLLING LIGHT TRANSMISSION THAT INCLUDES AT LEAST ONE TRANSPARENT LAYER SLOWING PHOTO REDUCTION DEGRADATION OF AN ACTIVE ELEMENT

(75) Inventors: Xue Yun Lin, Fontenay Aux Roses (FR); Corinne Papret, Antony (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/196,361

(22) Filed: Jul. 17, 2002

(65) Prior Publication Data

US 2002/0171788 A1 Nov. 21, 2002

Related U.S. Application Data

(63) Continuation of application No. 09/328,388, filed on Jun. 9, 1999, now Pat. No. 6,486,928.

(30) Foreign Application Priority Data

Jun. 10, 1998 (FR) .............................................. 98 07277

(51) Int. Cl.$^7$ ............................................ G02F 1/1333
(52) U.S. Cl. ......................... 349/16; 349/122; 349/165
(58) Field of Search ........................... 349/86, 16, 165, 349/122, 124; 359/265, 275

(56) References Cited

U.S. PATENT DOCUMENTS

| | | | | |
|---|---|---|---|---|
| 4,749,261 A | * | 6/1988 | McLaughlin et al. | 349/16 |
| 4,806,922 A | * | 2/1989 | McLaughlin et al. | 349/73 |
| 5,011,268 A | * | 4/1991 | Kaganowicz | 349/125 |
| 5,197,242 A | * | 3/1993 | Baughman et al. | 52/171.3 |
| 5,789,556 A | * | 8/1998 | Kaneko et al. | 534/577 |
| 6,055,088 A | * | 4/2000 | Fix et al. | 359/265 |
| 6,486,928 B1 | * | 11/2002 | Lin et al. | 349/16 |

\* cited by examiner

*Primary Examiner*—Robert H. Kim
*Assistant Examiner*—Andrew Schechter
(74) *Attorney, Agent, or Firm*—Oblon, Spivak, McClelland, Maier & Neustadt, P.C.

(57) ABSTRACT

The subject of the invention is an electrically controllable system having variable light scattering and/or transmission, comprising a functional film (1, 21) provided with electrically conducting layers (2, 3, 22, 23), the said film having active elements in the form of polarizing particles, or of liquid crystals associated with dichroic dyes, and in suspension in a medium. The said system is provided with one or more means preventing/compensating for degradation by photoreduction of at least some of the active elements, especially degradation of the dichroic dyes and/or that of the polarizing particles.

35 Claims, 2 Drawing Sheets

ELECTRICALLY CONTROLLABLE SYSTEM AND GLAZING UNIT HAVING A FUNCTIONAL COMPONENT FOR CONTROLLING LIGHT TRANSMISSION THAT INCLUDES AT LEAST ONE TRANSPARENT LAYER SLOWING PHOTO REDUCTION DEGRADATION OF AN ACTIVE ELEMENT

This application is a Continuation of application Ser. No. 09/328,388 Filed on Jun. 9, 1999, now U.S. Pat. No. 6,486,928.

BACKGROUND OF THE INVENTION

1. Field of the Invention

The present invention relates to electrically controllable systems having variable optical properties, and more specifically to glazing units in which the light scattering and/or the light transmission can be modified due to the effect of a suitable electrical supply.

2. Discussion of the Background

There is in fact a growing demand for so-called "smart" glazing, certain properties of which can be modulated as required. Controlling or modifying the level of light scattering of glazing thus allows the degree of visibility through the glazing to be controlled, especially so that it is transparent or, on the contrary, scattering, thus preventing individuals or objects on the other side of the glazing from being identified. There are various applications for such glazing: it is thus possible to consider equipping the internal partitions between rooms in a building, especially in offices, or between two areas/compartments of means of land, air or maritime locomotion with such glazing, or for equipping shop windows or display cabinets, or any type of container. In general, such glazing can also be used for equipping any window in a building or in means of locomotion (windows on trains, cabin portholes on boats or cabin windows on aircraft).

At the present time there are various families of functional systems having electrically controllable light scattering/transmission (hereafter referred to as "functional systems").

A first family of functional systems is known by the term liquid-crystal glazing. This is based on the use of a film based on a polymer material and placed between two conducting layers, droplets of liquid crystals, especially nematic liquid crystals having positive dielectric anisotropy, being dispersed in the said material. When a voltage is applied to the film, the liquid crystals orient in a preferred direction, thereby allowing vision. With no voltage applied, the crystals not being aligned, the film becomes diffusing and prevents vision. Examples of such films are described especially in European Patent EP 0,238,164 and U.S. Pat. Nos. 4,435,047, 4,806,922 and 4,732,456. This type of film, once laminated and incorporated between two glass substrates, is sold by Saint-Gobain Vitrage under the brand name "Priva-Lite" in fact, it is possible to use any device based on liquid crystals known as "NCAP" (Nematic Curvilinearly Aligned Phase) or "PLDC" (Polymer Dispersed Liquid Crystal) crystals.

Another family is that commonly referred to by the term optical valve: this generally involves films comprising a polymer matrix, optionally crosslinked, in which microdroplets are dispersed, these microdroplets containing particles which have the property of moving in a preferred direction under the action of an electric or magnetic field. Depending in particular on the potential applied to the terminals of the conducting layers placed on either side of these films and on the concentration and nature of the orientable particles, the films have variable optical properties. For example, Patent WO 93/09460 discloses an optical valve based on a film comprising a crosslinkable polyorganosiloxane matrix and inorganic or organic orientable particles, more particularly light-absorbing particles such as polyiodide particles. When a voltage is applied to the film, the particles intercept the light much less than when a voltage is not applied: this system therefore makes it possible to obtain glazing with variable light transmission, generally associated with light scattering that can also be varied.

Whether optical valves or liquid-crystal systems are used, these systems are usually in the form of a polymer film. To supply it with electrical power, it is usually placed between two electrically conducting layers, which in particular are transparent, for example made of doped metal oxide of the tin-doped indium oxide (ITO) type or the fluorine-doped tin oxide ($F:SnO_2$) type. Furthermore, the film with its two conducting layers is usually provided on at least one of its sides, and thus each of its sides, with a carrier/protector substrate. This is generally transparent. It may be chosen so as to be rigid or semi-rigid and made of inorganic or organic material, for example made of glass, or an acrylic polymer of the polymethyl methacrylate (PMMA) type. It may also be flexible, especially made of polyethylene terephthalate PET it is thus possible to have a structure of the PET/ITO/functional film/ITO/PET type, which is in the form of a flexible sheet that can be easily handled. This assembly (polymer+electrically conducting layers+at least one carrier substrate) can then be laminated to at least one transparent rigid substrate of the glass type using at least one joining layer of organic polymer of the polyvinyl butyral PVB or ethylene-vinyl acetate EVA type or certain polyurethanes PU.

Attempts have been made to add other functionalities to liquid-crystal glazing, especially in order to be able to vary not only its level of light scattering but also its level of light transmission, by making use of dyes. Patents EP 0,156,615 and EP 0,121,415 thus describe, for example, dyes of the pleochroic type, which are dissolved in the liquid crystal droplets, thereby making it possible to obtain glazing which is both dark/colored and diffusing when no voltage is applied, and both clear and non-diffusing when voltage is applied. Thus, a "screen" effect can be obtained, making the use of such glazing more attractive in the case of outside applications, for example as glazing for building facades or as car sunroofs.

However, these outdoor applications subject the glazing to considerable stress, and it has turned out that the functional systems with additional dyes (such as liquid-crystal glazing) or functional systems having polarizing particles which themselves provide a dye effect, especially by being of the dichroic type, have tended to have a markedly shorter lifetime than those which were devoid thereof, this being even more striking when they were used on the outside.

The object of the invention was therefore to remedy this drawback, by improving functional systems having electrically controllable light scattering/transmission, most particularly those using dichroic dyes or polarizing particles with a dye effect, the improvement being aimed especially at increasing their lifetime and increasing their durability.

SUMMARY OF THE INVENTION

The subject of the invention is firstly an electrically controllable system having variable light scattering/ transmission, which comprises a functional film provided with electrically conducting layers. This film has so-called "active" elements either in the form of particles, in particular polarizing particles (optical-valve system) or in the form of liquid crystals (liquid-crystal system) which are associated with dichroic dyes, and in suspension in a medium. The invention also provides the system with one or more means for preventing/compensating for degradation by photoreduction of at least some of the active elements, especially that of the dichroic dyes (in the case of liquid-crystal systems) or of the polarizing particles themselves (in the case of optical-valve systems).

This is because the invention has discovered the mechanism which caused the systems to age prematurely, this being a photoreduction mechanism which tended to irreversibly degrade the dichroic dyes and the polarizing particles when the systems were subjected to intense and/or prolonged ultraviolet radiation. The solution therefore consisted in using means for combating this degradation, these means being aimed either at preventing this photoreduction or, preferably, at allowing the dyes, in reduced/degraded form, to be as it were "regenerated" by permanently re-oxidizing them, thus "compensating" for the photochemical reduction that they undergo.

According to a first variant, the means preventing degradation by photoreduction comprises the use of at least one of the two electrically conducting layers in the form of a multicomponent layer comprising a conducting layer based on a doped metal oxide, the said layer being physically isolated from the functional film by at least one barrier layer of a different chemical nature.

The term "multicomponent" layer should be understood to mean a superposition of at least two layers made of different materials which together form the electrically conducting "layer" in the sense of the invention. The doped metal oxide in question may be doped tin oxide, especially fluorine-doped tin oxide $F:SnO_2$, tin-doped indium oxide ITO or zinc oxide doped, for example, with aluminum, all these materials being well known.

The term "physically isolated" should be understood to mean that there is no direct contact between the functional film and the layer of doped metal oxide. The inventors realized in fact that it is this direct contact which seemed to be responsible for the premature degradation of the system, one hypothesis explaining this being that the metal oxide would have photocatalysis properties sufficient to cause degradation of the film which is contiguous with it. The solution provided by the invention therefore consisted in making use of a barrier layer in order to be able to continue to use electrically conducting layers made of doped metal oxide without suffering the drawbacks thereof (this is because these layers are, moreover, highly advantageous since their manufacture, especially by pyrolysis of the CVD type or by vacuum sputtering, is well controlled and they provide the best balance between electrical conductivity and transparency) This barrier layer may be essentially metallic, especially made of nickel or chromium, or a nickel-chromium alloy. In this case, the layer is also conducting from an electrical standpoint, but it is preferably chosen to be relatively thin in order to prevent the appearance of the glazing being optically modified too much, so that the level of transparency of the multicomponent conducting layer is retained.

The barrier layer may thus be chosen to be made of a material with little or no conductivity, such as silicon or derivatives of silicon, especially silicon dioxide. Here again, it is advantageous to choose it so that the thickness sufficient for the above mentioned physical isolation is as small as possible. Silicon nitride $Si_3N_4$, silicon oxinitride $S_iON$ or aluminum nitride AlN may also be chosen. The silicon oxide is, in a non-limiting manner, the preferred example of the family of dielectrics based on non-photocatalytic oxides.

The barrier layers having all substantially no photocatalytic activity are generally chosen to have a thickness of less than 10 nm, especially less than 5 nm, for example between 0, 5 and 3 nm. (It is also possible to superpose two barrier layers of different nature, if desired). A more radical solution consists in not using electrically conducting layers based on doped metal oxide, at least on one side of the functional film, and in replacing it with a conducting material which is not based on an oxide.

Embodiments of this variant may be a system (fox example deposited between two flexible substrates or between a flexible substrate and a rigid substrate) comprising:
1) ITO
2) NiCr or $SiO_2$ barrier layer
3) functional film
4) NiCr or $SiO_2$ barrier layer
5) ITO
with identical "bilayer" conducting layers on each side of the functional film.

One of the two bilayers may be replaced by a metal monolayer, for example a gold-titanium alloy, or a metal multilayer, for example NiCr/Au/NiCr. It is also possible to combine the use of a multicomponent layer on one side of the functional film with a standard conducting layer made of doped metal oxide: a single conducting layer according to the invention already gives the system a longer lifetime.

The two bilayers may also be replaced with this metal monolayer or multilayer. The means preventing degradation then comprises selecting at least one essentially metallic electrically conducting layer (by therefore completely avoiding the use of a material made of doped metal oxide, in at least one of the two conducting layers). It has in fact been found that substituting the usual doped-oxide electrically conducting layers with metallic layers, or at least one of the two, considerably increased the lifetime of the system, although the precise reasons for this are not fully understood.

This variant has the advantage of being simple to implement: the techniques available for depositing thin metallic-type layers allow their parameters, especially their chemical nature, density and thickness, to be effectively controlled so as to obtain the desired properties, most particularly in this case a sufficient level of electrical conductivity combined with transparency. Mention may more particularly be made of the technology of deposition by magnet-field-enhanced sputtering.

The metal layer may advantageously be based on silver or gold, or generally on a noble metal or alloy containing at least one of them. In this case, it is desirable for the layer to be provided on at least one of its sides (preferably on both sides) with a thinner protective layer (and/or having an "anchoring" role), especially one also made of metal of the Ni alloy, of the NiCr or Iconel type, or steel type.

The metal layer may also be based on a gold-titanium alloy. This alloy is particularly advantageous since titanium appears to be able to stabilize gold, thereby making the above-mentioned protective layers optional, and even unnecessary.

According to a second variant (which is an alternative to or a combination with the first variant), the means preventing degradation comprises bringing the film prodded with its electrically conducting layers into contact, on at least one of its sides, with a sheet based on an oxygen-permeable polymer material. It has been found that the lifetime of the system could be considerably increased in this way. In a simplified/pictorial manner, it is just as if this sheet served as an oxygen "reservoir" for the film or allowed oxygen coming from an oxygen source to pass through it, this having an oxidizing effect which "compensates" for the reducing effect of the ultraviolet radiation on the dyes.

Advantageously, the sheet based on a polymer material has an oxygen permeability of at least 10 and especially at least 20 or 40 $cm^3/cm^2/mm/s/cmHg \times 10^{-10}$ measured in accordance with the ASTM-D1434 standard. It may especially be based on one or more polymers belonging to the polycarbonate family, having a permeability of approximately 55 $cm^3/cm^2/mm/s/cmHg \times 10^{-10}$ (especially those of the pliant/flexible type).

By way of comparison, the polyethylene terephthalate (PET) sheets normally used have a permeability of 0.3 $cm^3/cm^2/mmls/cmHg \times 10^{-10}$.

The term "sheet" should be taken in the wide sense: it may be a carrier substrate for the functional film and for a protective sheet and for a sheet allowing it to be laminated to a rigid substrate and, more generally, allowing it to be incorporated into glazing units of the multiple-glazing and/or laminated-glazing type. In general, this sheet is therefore pliant/flexible.

In fact, it is preferable for the electrically conducting layer(s) placed between the functional film and the oxygen-permeable sheet to have a degree of "porosity" allowing oxygen transfer. Likewise, provision may be made to trap enough oxygen in the permeable sheet so that it can gradually release oxygen towards the functional film. It is therefore desirable for this film to be in at least partial contact with a renewable oxygen source. If the assembly (functional film+electrically conducting layers+oxygen permeable sheet (s)) is intended to be incorporated in a glazing unit so that the permeable sheet(s) is (are) gripped between the film and for example, a rigid substrate which is not permeable to oxygen (laminated-glazing structure), it is possible to envisage providing the permeable sheet with peripheral venting means in order to ensure replenishment of the oxygen in the sheet, for example by means of capillaries.

If the aforementioned assembly is intended to be incorporated in a multiple-glazing unit of the insulating double-glazing or varietally dynamic glazing type, the permeable sheet may be placed so as to bring it into contact with the intermediate gas layer, of the air-layer type, by preferably providing an air replenishment system of the "breathable" glazing type.

BRIEF DESCRIPTION OF THE DRAWINGS

The invention will be explained in detail below with the aid of non-limiting examples illustrated by the following figures.

DESCRIPTION OF THE PREFERRED EMBODIMENTS

A preferred embodiment of the invention is in the form of a laminated glazing unit comprising the sequence: rigid substrate intermediate sheet/protective sheet/functional film having electrically conducting layers protective sheet/intermediate sheet/rigid substrate.

As mentioned at the beginning of the present text, the rigid substrate may be of the glass, acrylic, such as PMMA, or rigid polycarbonate type. The intermediate sheet is made of a thermoplastic polymer of the PVB, EVA or PU type and the protective sheet for the functional film may be flexible, of the PET or flexible polycarbonate type (the electrically conducting layers on either side of the functional film may be monolayers or stacks of at least two layers).

A second preferred embodiment of the invention is in the form of a multiple-glazing unit of the double-glazing type, comprising the sequence: rigid substrate intermediate sheet/protective sheet/functional film having electrically conducting layers/protective sheet/intermediate gas layer-rigid substrate.

The invention also relates to a multiple-glazing arrangement of the double-glazing type of the system, in which the functional film provided with the electrically conducting layers, and preferably with at least one protective sheet on each of its sides, is held taut in the intermediate gas layer separating the two rigid substrates of the multiple-glazing unit.

The system may be fastened together in various ways, especially using fastening and tensioning means and mechanical positioning means of the wedge, spacer or frame type, placed around the periphery of the glazing unit, especially between the two substrates around their periphery. The multiple-glazing unit may furthermore be designed to be openable, especially by a mechanical hinge system, for example, in order to gain access to the intermediate gas region where the system lies. The system may then be designed so as to be removable: a functionalized double-glazing unit is thus provided in which the functional system and, if necessary, optionally the rigid substrates of the glazing unit themselves can be easily changed, cleaned or repaired.

Preferably, peripheral sealing means for the intermediate gas layer are also provided. Should the gas (air) in the gas layer have to be replenished, it in possible to provide for the glazing unit to be opened periodically, if it is designed to be openable, or it is possible to provide the peripheral sealing means, of the seal (with desiccator) type, with capillaries.

This multiple-glazing structure is particularly suitable for implementing the second variant, by choosing as protective sheet "on the gas layer side" a highly oxygen-permeable sheet, with intermediate gas in the form of preferable replenishable air in an arrangement of the breathable-glazing type.

Whether the system is a laminated glazing unit or a multiple-glazing unit, it is therefore possible according to the invention to select at least one of the so-called "protective" sheets in the form of an oxygen-permeable sheet of the (flexible) polycarbonate or Plexiglass type and/or to select at least one of the electrically conducting layers to be made of a metallic material of the Ag or Au type.

These protective sheets also serve as flexible carrier substrates for the functional film.

The system according to the invention is preferably provided with a UV filter in order to attenuate the prejudicial effects of ultraviolet radiation on the active elements and, in particular, on the dichroic dyes. One embodiment of a UV filter consists, in the laminated/multiple-glazing structures described above, in laminating the external glass (the rigid substrate) with an additional rigid substrate by means of one or more sheets of a polymer having UV filter properties, for example a polymer based on polyurethane PV, polyvinyl butyral PVB or ethylene-vinyl acetate EVA, suitably treated, and optionally in also laminating the second glass in this way. Another embodiment, especially in the case of a laminated structure, consists in using at least one sheet of a polymer having UV filter properties as an intermediate sheet between at least one of the sheets for protecting the functional film and one of the rigid substrates. Laminating at least one side of the multiple-glazing unit may also provide the functionality of a screen.

The various components of the actual functional film will be described below.

Preferably, the active elements of the liquid-crystal type are in the form of droplets dispersed in the medium, with dichroic dyes dissolved in the said droplets. This is because, since these dyes are in fact organic molecules with an anisotropic absorption coefficient, it is necessary for the light-scattering active elements to be intimately associated with the dyes if it is desired to vary the light absorption (and therefore the light transmission) of the glazing unit and to vary its light scattering in an electrically controlled manner.

These dichroic dyes may, for example, be of the pleochroic-dye type, chosen from the family of diazoquinone derivatives or of the anthraquinone derivatives.

Advantageously, the percentage by weight of dichroic dyes with respect to the light-scattering active elements (namely the polarizing particles or the liquid crystals) may be selected to be within a range of between 0.1 and 3%, especially between 0.5 and 2%. This proportion is judicious for several reasons, because of a number of parameters, including the solubility limit of the dyes in the droplets, the size of the droplets, the intended value of the light transmission in the bleached/transparent state of the system depending on the type of active elements used, and on the type of medium used, etc.

With regard to the liquid crystals, these may be of the "NCAP" type, especially those used in "Priva-Lite" glazing units, or of the "PDLC" type, which were mentioned above. As a general rule, their birefringence is between 0.1 and 0.2 and can be varied, especially depending on the medium used, by about 0.1 if the polymer of the medium is of the polyurethane (PU) type and about 0.2 if it is of the polyvinyl alcohol (PEA) type.

This medium is in fact preferably based on a polymer from the PU (latex) and/or PVA family, this generally being prepared in aqueous phase with a proportion of polymers ranging from 15 to 50% by weight with respect to the water.

As was seen above with regard to the systems having polarizing particles, the latter in fact combined a light-scattering effect with, above all, a coloring effect which acts on the light transmission.

The light-scattering active elements are advantageously in the form of droplets with an average diameter of between 0.5 and 3 µm, especially between 1 and 2.5 µm, these being dispersed in the medium. The size of the droplets depends on a number of parameters, including the emulsifiability of the active elements in the medium in question. Preferably, these droplets represent between 120 and 220% by weight, especially between 150 and 200% by weight, of the medium excluding the generally aqueous solvent of the said medium.

Particularly preferably, liquid crystals are chosen in the form of droplets with a diameter of approximately 2.5 µm when the medium is based on a polyurethane latex (birefringence about 0.1) and with a diameter of approximately 1 µm when the medium is moreover based on polyvinyl alcohol (birefringence about 0.2). The size of the droplets may be selected, especially during the preparation of the emulsion by the chosen conditions, especially the duration and strength of the stirring used for making the emulsion, and/or the viscosity of the mixture, which viscosity can be adjusted by the temperature conditions of the mixture to be emulsified, and/or by the addition of surfactant-type additives. Adding the dyes also modifies the equilibrium of the emulsion.

When the medium is a polyurethane latex, it may thus be advantageous to cool the preparation to be emulsified (for example, to below 15° C., especially between 5 and 10° C.).

Once the emulsion with the desired droplet diameter has been obtained, it is frozen under these conditions by adding suitable stabilizers.

The combination of light-scattering active elements and light-transmission active elements, namely the dichroic dyes associated with the liquid crystals or the coloring polarizing particles, makes it possible to obtain glazing units which may, as required, be diffusing or non-diffusing and clear or dark. These glazing units may thus have a contrast of at least 3, or even at least 5 or 10 and higher, between their state with voltage applied and their state without voltage applied. The contrast is defined with respect to the ratio of the light transmission of the glazing unit in the clearest/most transparent state (the state generally corresponding therefore to the state with voltage applied) to the light transmission in the darkest/most opaque state (the state with no voltage applied).

These twin-functionality systems have many applications, already mentioned, especially in the case of outside glazing for buildings, roof glazing, motor-vehicle windows of the sunroof type, their durability, enhanced by the invention, allowing outdoor applications, and, of course, also in the case of internal glazing, especially for partitions. They may also be used for equipping windows/portholes of any means of transport of the train, plane or boat type.

Another interesting application relates to all display devices or display screens.

EXAMPLE 1

Figure 1:
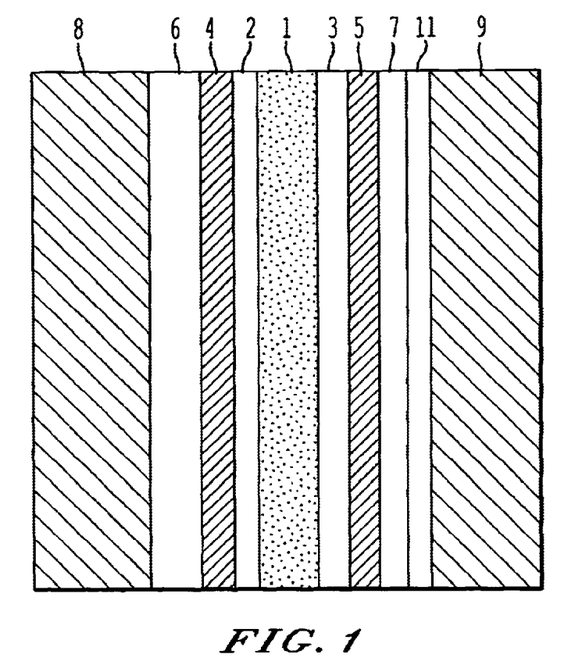
FIG. 1: a laminated glazing unit according to the invention.

This example relates to the laminated glazing unit shown diagrammatically in FIG. 1 (the various materials shown are not drawn to scale for the sake of clarity).

Its general structure is as follows: it comprises the actual functional film 1 provided on one of its sides with a transparent electrically conducting layer 2 made of tin-doped indium oxide ITO and on the other of its sides with a stack 3 of transparent conducting layers NiCr/Au/NiCr, with the two NiCr layers having a thickness of 1 nm and the Au layer having a thickness of 6 nm.

This conducting multilayer film 1, 2, 3 is provided with two sheets 4, 5 of PET 175 µm in thickness and laminated to two glass plates 8, 9 (made of clear silica-soda-lime glass with a thickness of 2 mm) with, on one side, an intermediate sheet 6 of PVB having a thickness of 0.76 mm and with, on the other side, two sheets 7, 11 of anti-UV-treated PVB (the electrical supply system is produced in a known manner and not shown/detailed here).

The film 1 has a thickness of 30 µm. It consists of a medium in the form of a 40% by weight polyurethane (PU) prepared in water, in which microdroplets of liquid crystals of the NCAP type are dispersed in a proportion by weight of 165% with respect to the PU (without the solvent), the liquid crystals having an average diameter of 1.5 µm and a birefringence of 0.1. The microdroplets contain 1% by weight of a dichroic dye of the pleochroic type, which is dissolved and, in the state with no voltage applied, imparts a dark color in the blacks. This film is obtained by making an emulsion, with vigorous stirring, between the liquid crystals, in which the dyes have been dissolved, and the medium and then by forming the film by casting the emulsion on the PET sheet provided beforehand with the electrically conducting ITO layer. After the film has dried in order to remove the solvent from the medium, it is calendered with the second PET sheet provided with the metal layer.

This structure illustrates the first variant of the invention, namely the substitution of one of the conventional ITO conducting layers with a metal conducting layer.

When a voltage is applied, the glazing unit is in a non-diffusing state, with a haze of at most 8%, and a clear state, with a light transmission value $T_L$ under illuminant D65 of 40%. When no voltage is applied/it is diffusing, with a haze of at least 96%, and dark, with a $T_L$ of 10%. A contrast C of approximately 4 is thus obtained. (The haze is defined as the ratio of the diffuse transmission to the total transmission, both transmissions being measured at 550 nm).

It will be noted that the glazing unit here is therefore provided with a UV filter, in this case formed by the two anti-UV-treated PVS sheets 7, 11, each with a thickness of 0.76 mm, substituting for a standard intermediate sheet of PVB, like the PVB sheet 6. The arrangement is such that it is the glass plate 9 which faces the outside.

The glazing unit thus formed was subjected to an accelerated weathering test according to the "day" cycle of the SAE (Society of Automotive Engineers) standard J1885, by exposing it at 90° C. to continuous radiation of 340 nm wavelength at 0.55 W/nm/m² on a black panel. It withstood the degradation for an exposure time of 240 hours (i.e. the difference $\Delta E^*$ in the $(L^*,a^*,b^*)$ calorimetry system between the state of the glazing unit at the time t and its state at the initial time to, when no voltage is applied to it, remained less than or equal to 5 throughout this period of time).

COMPARATIVE EXAMPLE 1

By way of comparison, the same test was carried out on a glazing unit in every way identical to the glazing unit in Example 1 but by using a second ITO layer, identical to the first, instead of the NiCr/Au/NiCr stack: this comparative glazing unit withstood only 70 hours, therefore corresponding to a lifetime more than three times shorter than the glazing unit in Example 1 according to the invention. This also relates to a laminated glazing unit according to the structure shown in FIG. 1.

In this example, another type of functional film 1 was used, this allowing a higher contrast C to be obtained. It has a thickness of 30 μm and consists of a medium with a 20% by weight PU and PVA latex prepared in water, in which droplets of liquid crystals of the NCAP type are dispersed in a proportion by weight with respect to the PU+PVA latex of approximately 165%, the liquid crystals having a diameter of approximately lam and a high birefringence, equal to 0.2.

2% of the same dark dichroic dye as in Example 1 are dissolved in these droplets.

This glazing unit has, when no voltage is applied, a non-diffusing state with a haze of at most 15% and a $T_L$ of 30%. When no voltage is applied, it is diffusing with a haze of 100% and a $T_L$ of 2%. A contrast C of 15 is thus achieved.

This glazing unit provided with the UV filter was subjected to the same accelerated weathering test as in Example 1: it withstood the degradation for 200 hours according to the same criterion.

COMPARATIVE EXAMPLE 2

This Comparative Example 2 in identical to Example 2, apart from the fact that it uses a second ITO conducting layer rather than an NiCr/Au/NiCr stack. It withstood only 60 hours in the weathering test, therefore corresponding to a lifetime which is three times shorter than that in Example 2 according to the invention.

EXAMPLE 3

Figure 2:
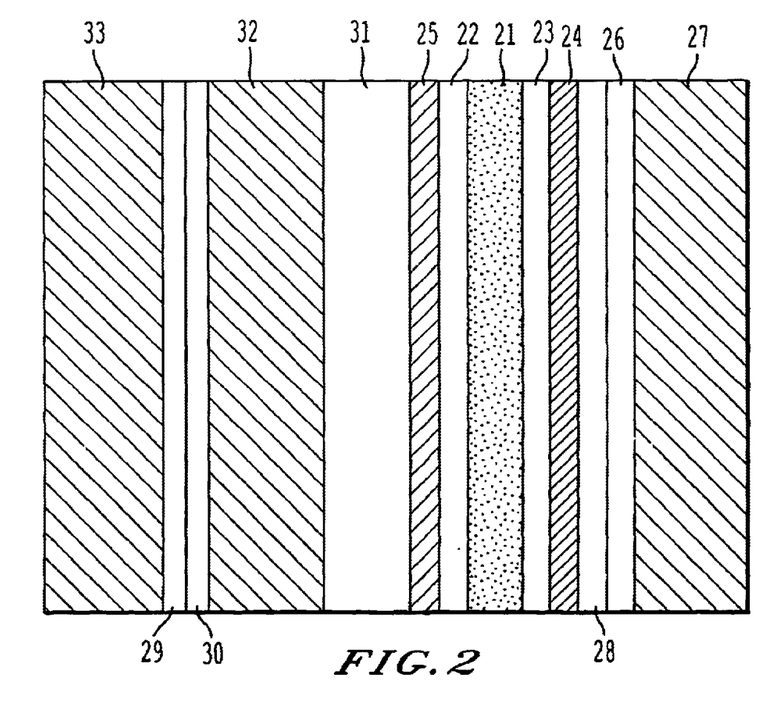
FIG. 2: a double-glazing unit according to the invention.

This example refers to the double-glazing unit shown very schematically in FIG. 2.

It comprises the functional film 21 provided on each of its sides with an ITO layer 22, 23 (the same functional film and the same ITO layers as in Example 1). This multilayer film 21, 22, 23 is provided on one of its sides with a PET sheet 24 identical to the PET layer 4 in Example 1 and on the other of its sides with a sheet 25 of flexible polycarbonate 175 μm in thickness. The ITO layer 22 in contact with the polycarbonate sheet 25 is deposited by sputtering so as to have sufficient porosity (with respect to oxygen).

Next, on the PET sheet 24 side, there are two sheets 26, 28 of anti-UV PVB (like the sheets 7, 11 in FIG. 1), followed by a glass substrate 27.

On the polycarbonate sheet 25 side, there is then an intermediate air layer 31 followed by a glass plate 32 (identical to the other glass plates in the glazing unit).

This glass plate 32 is also provided with a UV filter composed of two anti-UV-treated PVB sheets 29, 30 (identical to the sheets 26, 28) and laminated to a third glass plate 33 identical to the other two glass plates.

For the sake of clarity, the electrical supply system for the film 21 has not been shown, nor has the system for mounting the double-glazing unit.

This glazing unit therefore illustrates the second variant of the invention, in which one of the PET sheets is substituted with a sheet of polycarbonate highly permeable to oxygen and in permanent contact with the air layer of the double-glazing unit (by preferably providing the glazing unit with openings allowing replenishment of the air in the air layer).

EXAMPLE 4

Figure 3:
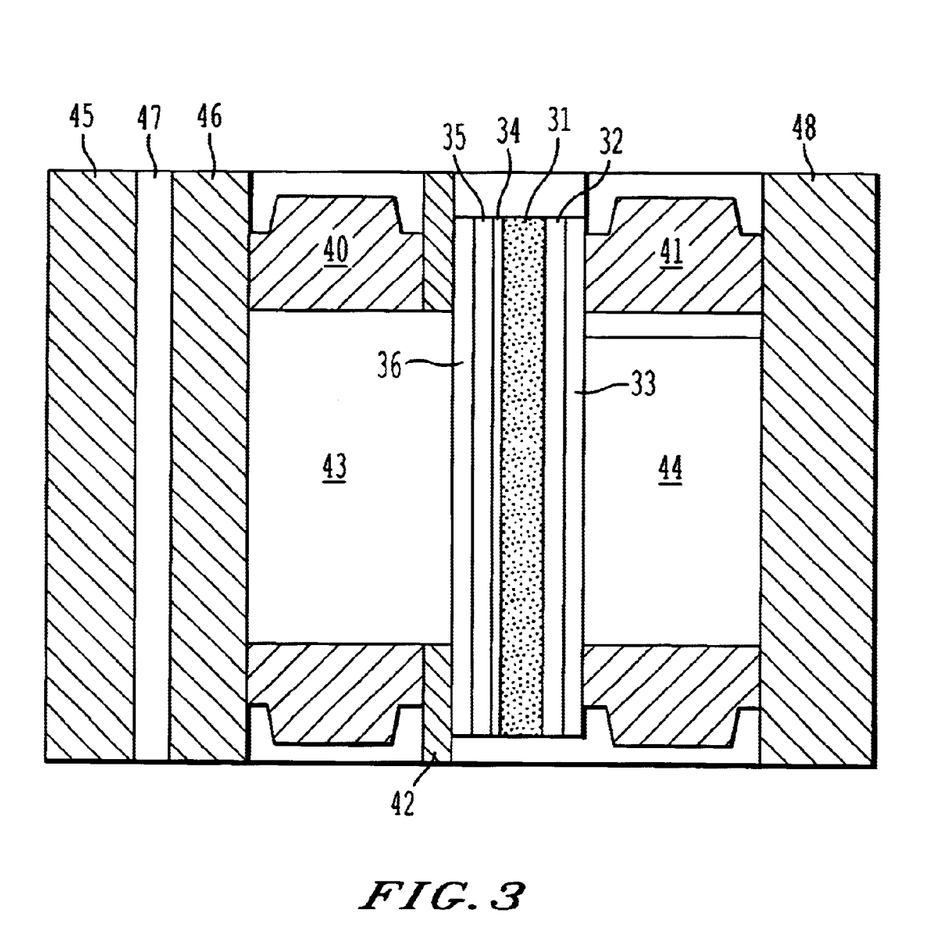
FIG. 3: a second double-glazing unit according to the invention.

This example relates to the double-glazing unit shown very schematically in FIG. 3.

It comprises a functional film 31 identical to that in the previous example, provided on one side with a stack 32 of NiCr/Au/NiCr conducting layers (as in Example 1) and then with a PET sheet 33, as in the previous example, and, on the other side, with a stack of conducting layers comprising, on the film side, an approximately 8 nm barrier layer 34 made of NiCr, followed by an ITO layer 35, like the layer 22 in Example 3. This stack is covered with another PET sheet 36 identical to the sheet 33. This assembly is mounted in the interpane space of a double-glazing unit using peripheral hollow spacers 40, 41 immobilized by a polymer-based spacer 42, according to an arrangement similar to that proposed in U.S. Pat. No. 5,784,853 relating to a PET film which is provided with a thermal-radiation reflection layer also held taut in the interpane space of a double-glazing unit. Reference will be made to this patent with regard to the choice of materials for these spacers and the peripheral sealing system provided. The gas layer (preferably an air or oxygen layer) is thus separated into two regions 43, 44 on each side of the functional system of the invention.

The external rigid substrate consists of two glass substrates 45, 46 laminated together with an EVA sheet 47 having anti-UV properties. The internal rigid substrate 48 is a monolithic glass substrate. Alternatively, it may be laminated in a similar manner to the external rigid substrate.

Advantageously, the peripheral arrangement of the double-glazing unit may be designed so as to make the interpane space accessible in order to clean the internal faces of the rigid substrates and/or to replenish the air in the regions 43, 44 and/or to replace the functional system, if required.

It is provided with a UV filter on the exterior side. Another one may be provided on the interior side.

It has been found that such a glazing unit had approximately a lifetime at least three times longer than a glazing unit identical in every way but having a PET sheet instead of the PC sheet 25.

In this example, the NiCr barrier layer is optional. If it is omitted, there is then, on one side of the liquid-crystal film, a standard ITO conducting layer and, on the other side, a conducting layer according to the invention, this arrangement already being sufficient to increase the lifetime of the system appreciably.

In conclusion, the invention has made it possible to discover how to reduce the premature degradation of glazing units having electrically controllable scattering and containing dichroic dyes or polarizing particles, by using various means to inhibit/prevent/compensate for the phenomenon of photoreduction of the dichroic dyes/dichroic polarizing particles.

It goes without saying that the two variants of the invention may be combined, that is to say it is possible to provide for the functional films to have both conducting metal layers and oxygen-permeable polymer sheets. It is therefore possible to use either a conducting layer according to the invention, keeping the other layer standard, or two conducting layers according to the invention. The layer according to the invention may comprise a material based on a doped metal oxide together with a "barrier" at the interface with the liquid-crystal film (preferably based on a material devoid of photocatalytic properties) or may completely omit this type of material, the discovery of the invention being the elimination of any direct contact between this material and the liquid-crystal film. The other non-exclusive variant of the previous one consists in modifying the level of oxygen permeability of at least one of the protective sheets of the system.

The invention makes it possible to widen the application of such glazing units, by also providing outdoor applications in which the glazing units are particularly exposed to solar UV radiation, even in particularly stressing configurations, i.e. in a horizontal or oblique position (sunroof, roof windows, etc.). The invention has proved to be effective even in the case of high-contrast glazing and/or when the amount of dye is relatively high.

What is claimed is:

1. A system of components including an ultra violet filter and a separate functional component for controlling light transmission, said separate functional component comprising:
   a film containing electrically controllable elements dispersed in a medium and configured to control light transmission, said electrically controllable elements being subject to photoreduction degradation and comprised of polarizing particles or liquid crystals associated with dichroic dyes; and
   two transparent layers positioned on opposite sides of said film with each transparent layer being configured to include at least one electrically conducting layer portion,
   wherein at least one of the two transparent layers is further configured to permit oxygen to permeate there through and into said film so as to slow down the photoreduction degradation occurring relative to said electrically controllable elements to add to the slow down of photoreduction degradation for the electrically controllable elements provided by the ultra violet filter.

2. The system according to claim 1, wherein the medium includes at least one polymer of the polyurethane family or the polyvinyl alcohol family prepared in a solvent in a proportion by weight of at least 15% and no greater than 50% with respect to said solvent.

3. The system according to claim 1, wherein the system is included as part of a display screen.

4. The system according to claim 1, wherein the system includes further components forming a multiple glazing unit having two plates, with the functional component having one side thereof laminated on a first inside surface of one of the two plates that faces a second inside surface on the other one of the two plates and having a polycarbonate film covering a second side thereof opposite to the first side, said polycarbonate film being in contact with a gas layer that is formed between the polycarbonate film and the second inside surface.

5. The system according to claim 1, wherein the electrically controllable elements are formed as polarizing particles dispersed in said medium.

6. The system according to claim 5, wherein the polarizing particles are further formed as droplets having a diameter of at least 0.5 $\mu$m and no greater than 3.0 $\mu$m.

7. The system according to claim 5, wherein the polarizing particles are further formed as droplets having a diameter of at least 1.0 $\mu$m and no greater than 2.5 $\mu$m.

8. The system according to claim 6, wherein the percentage by weight of the droplets with respect to the medium excluding any solvents is at least 150% and no greater than 200%.

9. The system according to claim 1, wherein the at least one of the transparent layers that is further configured to slow down the process of photoreduction degradation includes a sheet of a polymer material in contact with the electrically conducting layer portion, said sheet having an oxygen permeability of at least 10 $cm^3/cm^2/mm/s/cmHg \times 10^{-10}$ or greater according to the ASTM-D1434 standard.

10. The system according to claim 9, wherein the polymer material is a polycarbonate.

11. The system according to claim 9, wherein the oxygen permeability is at least 20 $cm^3/cm^2/mm/s/cmHg \times 10^{-10}$ or greater according to the ASTM-D1434 standard.

12. The system according to claim 9, wherein the oxygen permeability is at least 40 $cm^3/cm^2/mm/s/cmHg \times 10^{-10}$ or greater according to the ASTM-D1434 standard.

13. The system according to claim 9, wherein the sheet is configured to receive oxygen from a renewable oxygen source.

14. The system according to claim 9, wherein the system includes further components configured together to form a glazing unit with the sheet being a substrate carrying the film and the two transparent layers to provide for easy assembly into the glazing unit.

15. The system according to claim 1, wherein the electrically controllable elements are liquid crystals associated with dichroic dyes dispersed in said medium.

16. The system according to claim 15, wherein the liquid crystals are formed as droplets dispersed in said medium with the dichroic dyes being dissolved within said droplets.

17. The system according to claim 15 wherein the dichroic dyes include diazoquinone derivatives or anthraquinone derivatives.

18. The system according to claim 15, wherein the percentage by weight of the dichroic dyes with respect to the liquid crystals is at least 0.1% and no greater than 3.0%.

19. The system according to claim 15, wherein the percentage by weight of the dichroic dyes with respect to the liquid crystals is at least 0.5% and no greater than 2.0%.

20. The system according to claim 15, wherein the liquid crystals are in the form of droplets with a diameter of at least 1.0 µm and no greater than 2.5 µm.

21. The system according to claim 15, wherein the film includes a polyurethane latex medium configured to contain the liquid crystals in the form of droplets having a diameter of approximately 2.5 µm.

22. The system according to claim 15, wherein the film includes a polyvinyl alcohol medium configured to contain the liquid crystal in the form of droplets having a diameter of approximately 1.0 µm.

23. The system according to claim 15, wherein the liquid crystals are in the form of droplets with a diameter of at least 0.5 µm and no greater than 3.0 µm.

24. The system according to claim 23 wherein the percentage by weight of the droplets with respect to the medium excluding any solvents is at least 150% and no greater than 200%.

25. A multiple-glazing unit including an ultra violet filter, two rigid substrates, an internal gas layer, and a supporting configuration to maintain a functional component for controlling light transmission in the intermediate gas layer, said functional component comprising:
- a film containing electrically controllable elements dispersed in a medium and configured to control light transmission, said electrically controllable elements being subject to photoreduction degradation and comprised of polarizing particles or liquid crystals associated with dichroic dyes; and
- two transparent layers positioned on opposite sides of said film with each transparent layer being configured to include at least one electrically conducting layer portion,
- wherein at least one of the two transparent layers is further configured to slow down the photoreduction degradation occurring relative to said electrically controllable elements to add to the slow down of photoreduction degradation for the electrically controllable elements provided by the ultra violet filter.

26. The multiple-glazing unit according to claim 25, wherein the ultra violet filter includes a polymer sheet.

27. The multiple-glazing unit according to claim 26, wherein the polymer sheet is made of one of PVB, PU, or EVA and is laminated to one of the rigid substrates or to an additional rigid substrate or is a polymer sheet between the functional component and one of the rigid substrates.

28. A laminated glazing unit including an ultra violet filter and two outermost rigid substrates that sandwich at least one internal sheet carrying a functional component for controlling light transmission, said functional component comprising:
- a film containing electrically controllable elements dispersed in a medium and configured to control light transmission, said electrically controllable elements being subject to photoreduction degradation and comprised of polarizing particles or liquid crystals associated with dichroic dyes; and
- two transparent layers positioned on opposite sides of said film with each transparent layer being configured to include at least one electrically conducting layer portion,
- wherein at least one of the two transparent layers is further configured to slow down the photoreduction degradation occurring relative to said electrically controllable elements to add to the slow down of photoreduction degradation for the electrically controllable elements provided by the ultra violet filter.

29. The system according to claim 28, wherein the internal sheet is made of an oxygen permeable material and is positioned next to at least one of the transparent layers.

30. A system of components including an ultra violet filter and a separate functional component for controlling light transmission, said separate functional component comprising:
- a film containing electrically controllable elements dispersed in a medium and configured to control light transmission, said electrically controllable elements being subject to photoreduction degradation and comprised of polarizing particles or liquid crystals associated with dichroic dyes; and
- two transparent layers positioned on opposite sides of said film with at least one of the transparent layers being configured to include an electrically conducting doped metal oxide sub-layer and a non-photocatalytic dielectric barrier sub-layer,
- wherein said non-photocatalytic dielectric barrier sub-layer is positioned closer to said film than said metal oxide sub-layer and includes one of $Si_3N_4$, AlN, or SiON configured to add to the slow down of the photoreduction degradation for the electrically controllable elements provided by the ultra violet filter.

31. A system of components including an ultra violet filter and a separate functional component for controlling light transmission, said separate functional component comprising:
- a film containing electrically controllable elements dispersed in a medium and configured to control light transmission, said electrically controllable elements being subject to photoreduction degradation and comprised of polarizing particles or liquid crystals associated with dichroic dyes; and
- two transparent layers positioned on opposite sides of said film with at least one of the transparent layers being configured to include an electrically conducting doped metal oxide sub-layer and a non-photocatalytic dielectric barrier sub-layer,
- wherein the non-photocatalytic dielectric barrier sub-layer has a thickness of less than 5 nm, is positioned closer to said film than said metal oxide sub-layer, and includes one of $Si_3N_4$, AlN, or SiON configured to add to the slow down of the photoreduction degradation for the electrically controllable elements provided by the ultra violet filter.

32. A system of components including an ultra violet filter and a separate functional component for controlling light transmission, said separate functional component comprising:
- a film containing electrically controllable elements dispersed in a medium and configured to control light transmission, said electrically controllable elements being subject to photoreduction degradation and comprised of polarizing particles or liquid crystals associated with dichroic dyes; and two transparent layers positioned on opposite sides of said film with at least one of the transparent layers being configured to include an electrically conducting doped metal oxide sub-layer and a non-photocatalytic dielectric barrier sub-layer, wherein the non-photocatalytic dielectric barrier sub-layer has a thickness of at least 0.5 nm and no greater than 3.0 nm, is positioned closer to said film than said metal oxide sub-layer, and includes one of $Si_3N_4$, AlN, or SiON configured to add to the slow down of the photoreduction degradation for the electrically controllable elements provided by the ultra violet filter.

33. A system of components including an ultra violet filter and a separate functional component for controlling light transmission, said separate functional component comprising:

a film containing electrically controllable elements dispersed in a medium and configured to control light transmission, said electrically controllable elements being subject to photoreduction degradation; and two transparent layers positioned on opposite sides of said film with each transparent layer being configured to include at least one electrically conducting layer portion, wherein at least one of the two transparent layers further includes a completely metallic sub-layer configured to add to a slow down of the photoreduction degradation occurring relative to said electrically controllable elements.

34. The system according to claim 33 wherein said completely metallic sub-layer is a monolayer of silver or gold.

35. A double-glazing unit including an ultra violet filter and two outer rigid substrates that sandwich at least one internal sheet carrying a separate functional component for controlling light transmission and at least one intermediate gas layer, said separate functional component comprising:

a film containing electrically controllable elements dispersed in a medium and configured to control light transmission, said electrically controllable elements being subject to photoreduction degradation and comprised of polarizing particles or liquid crystals associated with dichroic dyes; and two transparent layers positioned on opposite sides of said film with each transparent layer being configured to include at least one electrically conducting layer portion, wherein at least one of the two transparent layers is further configured to slow down the photoreduction degradation occurring relative to said electrically controllable elements to add to the slow down of photoreduction degradation for the electrically controllable elements provided by the ultra violet filter.

* * * * *